US009001170B2

(12) United States Patent
Yuno et al.

(10) Patent No.: US 9,001,170 B2
(45) Date of Patent: Apr. 7, 2015

(54) PRINTER AND PRINTING METHOD

(71) Applicant: Casio Computer Co., Ltd., Tokyo (JP)

(72) Inventors: Hirotaka Yuno, Fussa (JP); Yasushi Murai, Ome (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 13/926,862

(22) Filed: Jun. 25, 2013

(65) Prior Publication Data

US 2014/0002569 A1 Jan. 2, 2014

(30) Foreign Application Priority Data

Jun. 29, 2012 (JP) ................................ 2012-146675
Mar. 12, 2013 (JP) ................................ 2013-048744

(51) Int. Cl.

*B41J 17/00* (2006.01)
*B41J 13/00* (2006.01)
*B41J 3/407* (2006.01)
*B41J 11/42* (2006.01)
*B41J 11/04* (2006.01)
*G01D 15/24* (2006.01)
*B41J 17/28* (2006.01)

(52) U.S. Cl.

CPC ............ *B41J 13/0009* (2013.01); *B41J 3/4075* (2013.01); *B41J 11/425* (2013.01)

(58) Field of Classification Search

CPC .............. B41J 2/32; B41J 2/325; B41J 11/42; B41J 11/425; B41J 11/0025; B41J 11/003; B41J 11/0035; B41J 11/009; B41J 13/0009; B41J 13/0018; B41J 13/0027–13/0081; B41J 13/009; B41J 15/04; B41J 15/042–15/046; B41J 29/38; B41J 29/393

USPC .................................... 347/16, 215, 218, 221

See application file for complete search history.

(56) References Cited

U.S. PATENT DOCUMENTS 5,505,550 A * 4/1996 Kitahara et al. .............. 400/618
7,940,291 B2 * 5/2011 Koyabu ......................... 347/218
8,534,938 B2 * 9/2013 Iga .................................. 400/76
2011/0200377 A1 8/2011 Iga
2011/0318080 A1 * 12/2011 Hatanaka et al. ............. 400/582

FOREIGN PATENT DOCUMENTS

JP 2001-018939 A 1/2001
JP 2010-167701 A 8/2010
JP 2011-167939 A 9/2011

* cited by examiner

*Primary Examiner* — Jannelle M Lebron
*Assistant Examiner* — Jeremy Bishop
(74) *Attorney, Agent, or Firm* — Holtz, Holtz, Goodman & Chick PC

(57) ABSTRACT

A printer includes a conveyor roller for conveying a long printing tape having an adhesive but no release paper on a back surface thereof, a printing mechanism for performing printing on the printing tape conveyed, a drive unit for rotationally driving the conveyor roller, and a control unit for controlling the drive unit so that a rotational speed thereof becomes a constant speed slower than a standard speed when the printing tape is initially conveyed and then becomes the standard speed after it is conveyed a contact length of the conveyor roller with the printing tape. Thus, a risk can be prevented of a tape jam occurring in the printer due to the tape member remaining sticking to the conveyor roller when it is conveyed for the next printing because the tape member with the adhesive has been left stationary long in the printer.

24 Claims, 12 Drawing Sheets

PRINTER AND PRINTING METHOD

CROSS-REFERENCE TO RELATED APPLICATION

This application is based upon and claims the benefit of priority under 35 USC 119 to Japanese Patent Application No. 2012-146675 filed on Jun. 29, 2012 and Japanese Patent Application No. 2013-48744 filed on Mar. 12, 2013, the contents of which are incorporated herein by reference.

BACKGROUND OF THE INVENTION

1. Field of the Invention

The present invention relates to a printer and more particularly to a printer and a printing method for performing printing on a long rolled tape member as a printing member.

2. Description of the Related Art

Today, there are printers for preparing arbitrary labels by printing character strings on a tape member based on character data inputted from a keyboard or received from other equipment.

Additionally, in some of tape members for use in such printers, a label can be prepared using a printing tape carrying a release tape which is provided thereon in advance, and in other tape members, a label can be prepared using a printing tape carrying an adhesive applied to a back surface thereof without carrying a release tape. Then, depending upon printers, these tape members can be used therein as required.

For example, KOKAI (Japanese Unexamined Patent Publication) No. 2010-167701 discloses a printer in which whether or not a release tape is present on a tape member which is fed out of a tape cassette is detected by an optical sensor and in case no release tape is detected, a half-cutting treatment by a half-cutting mechanism is disabled.

However, when a tape member having no release tape but having an adhesive is left mounted as it is in a printer for a long period of time, there are fears that a conveyor roller and the tape member are secured to each other by the adhesive and when the conveyance of the tape member is attempted to be restarted in the next printing operation, the conveyor roller and the tape member do not separate from each other, causing a tape jam in an interior of the printer.

BRIEF SUMMARY OF HE INVENTION

The invention has been made in view of these situations and an object thereof is to provide a printer and a printing method for performing printing while reducing a risk of a printing member jam in an interior of the printer.

With a view to attaining the object of the invention described above, according to an aspect of the invention, there is provided a printer including a conveyor roller for conveying a printing member having an adhesive on a back surface which is opposite to a printing surface thereof, a printing mechanism for performing printing on the printing member which is conveyed, a drive unit for driving to rotate the conveyor roller, and a control unit for controlling the drive unit so as to drive to rotate the conveyor roller to convey the printing member at a constant speed which is slower than a standard speed when the printing member is started to be conveyed and to drive to rotate the conveyor roller to convey the printing member at the standard speed after the printing member is conveyed by a predetermined length.

With a view to attaining the object of the invention described above, according to a different aspect of the invention, there is provided a printing method for controlling a rotational speed of a conveyor roller for conveying a printing member having an adhesive on a back surface which is opposite to a printing surface thereof to a printing mechanism for performing printing on the printing member so that the rotational speed of the conveyor roller becomes a constant speed at which the printing member is conveyed at a slower speed than a standard speed when the printing member is started to be conveyed and then becomes the standard speed after the printing member is conveyed by a predetermined length at the constant speed.

In addition, in the printer and the printing methods according to the aspects of the invention, the conveyor roller is brought into contact with the back surface of the printing member so as to convey the printing member. Additionally, the predetermined length by which the printing member is conveyed at the constant speed which is slower than the standard speed is a contact length over which the conveyor roller is in contact with the back surface of the printing member. In addition, the drive unit is a DC motor, and the printing member is a rolled long tape member. Further, the printer may include a cutter mechanism from time to time.

Additionally, in the printer and the printing method according to the aspects of the invention, the control unit can be configured so as to measure a length of time that elapses since a point in time when the previous printing operation by the printing mechanism ended to thereby determine whether the printing member is controlled to be conveyed at the constant speed and then conveyed at the standard speed or the printing member is controlled to be conveyed at the standard speed without being conveyed at the constant speed based on the time that elapses so.

Further, in the printer and the printing method according to the aspects of the invention, the printer can include various different types of printing members for change which differ from each other by the existence of release paper which covers the adhesive or by the type of the adhesive, and the printer can include further a printing member detection unit for detecting the type of a printing member loaded therein. Then, the control unit preferably sets the constant speed and/or the standard speed of the rotational speed of the conveyor roller for a printing member loaded based on the type of the adhesive detected by the printing member detection unit with respect to the printing member loaded. As this occurs, when it is detected by the printing member detection unit that the printing member loaded has release paper, the control unit can control so that the printing material is conveyed at the standard speed without being conveyed at the constant speed.

In this way, according to the invention, it is possible to provide the printer and the printing method which can perform printing while reducing the risk of the printing member jam in the interior of the printer.

BRIEF DESCRIPTION OF THE SEVERAL VIEWS OF THE DRAWINGS

A more complete understanding of this application can be obtained when the following detailed description is considered in conjunction with the following drawings, in which.

DETAILED DESCRIPTION OF THE INVENTION

Hereinafter, an embodiment of the invention will be described in detail by reference to the drawings.

Figure 1:
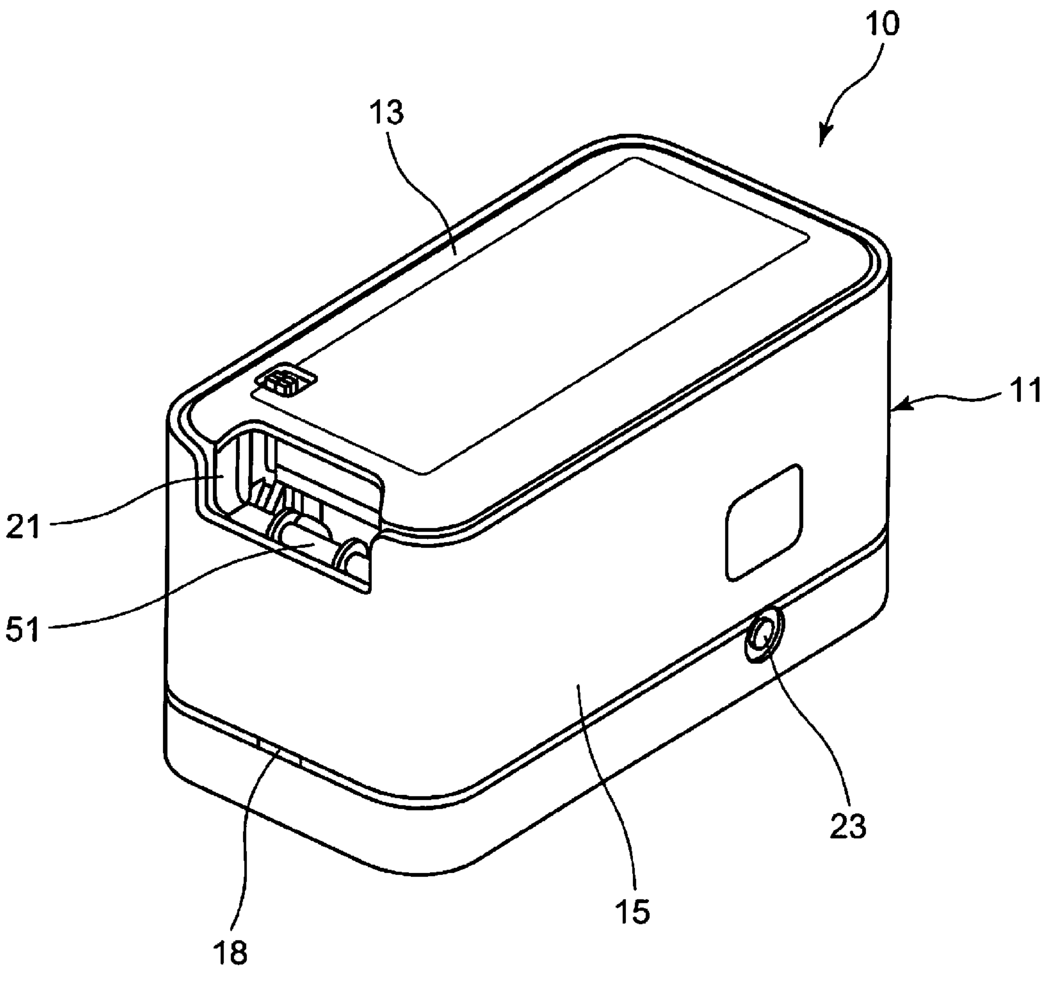
FIG. 1 is a perspective view showing an external appearance of a printer according to the invention.
Figure 2:
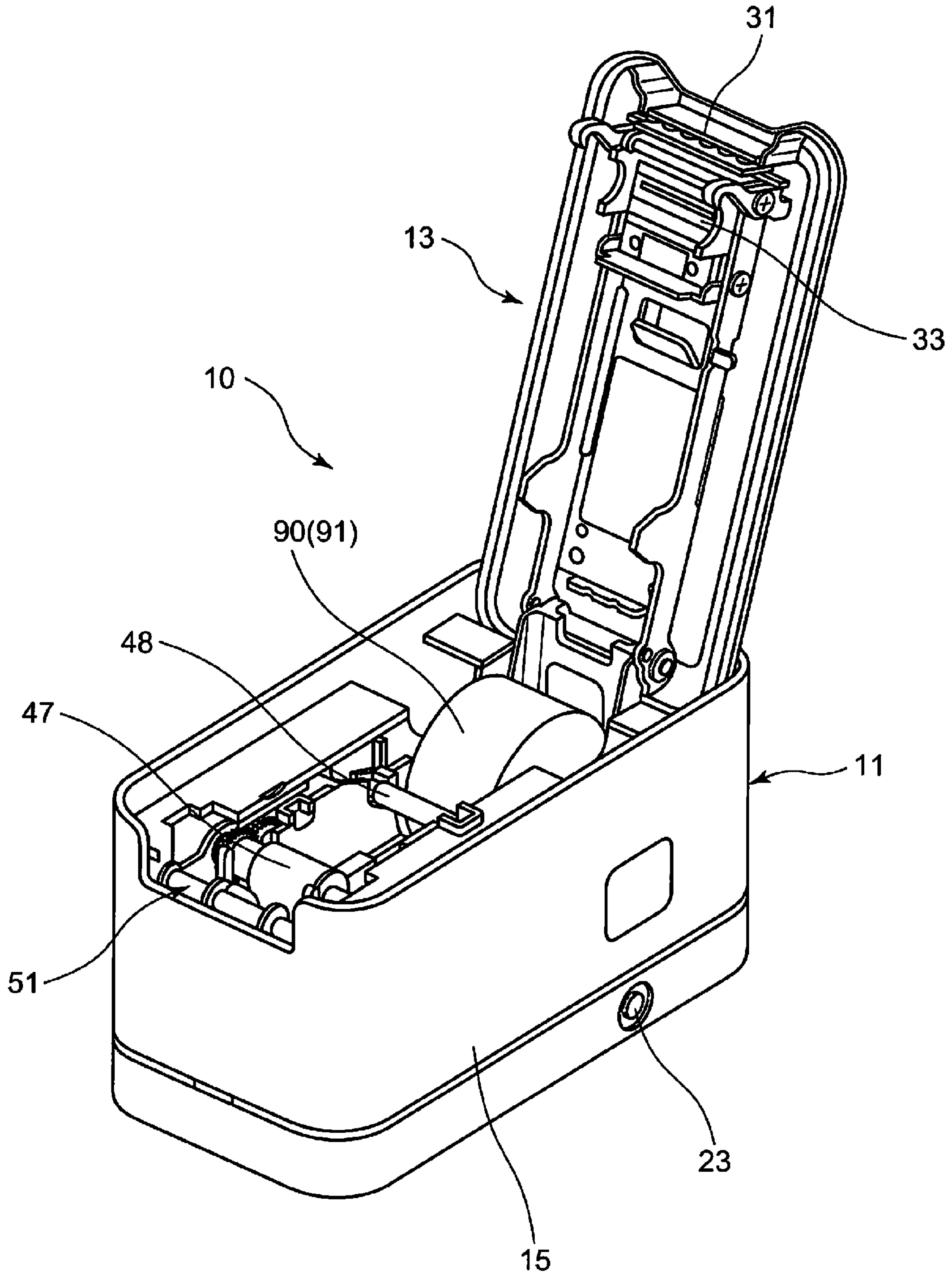
FIG. 2 is a perspective view showing a state in which an upper lid portion of the printer according to the invention is opened.

FIG. 1 is a perspective view showing an external appearance of a printer 10 according to the invention. FIG. 2 is a perspective view showing a state in which an upper lid portion 13 of the printer 10 according to the invention is opened. It should be noted that in this embodiment, when referring to vertical directions with respect to the printer 10, for example, in FIG. 1, a side of the printer 10 where an upper lid portion 13 is provided is referred to as an upper side and a base side of the printer 10 where the printer 10 is placed on a table or desk, for example, is referred to as a lower side. Additionally, when referring to horizontal longitudinal directions with respect to the printer 10, a side of the printer 10 where a discharge port 21 from which a tape member is discharged is provided is referred to as a front side.

As shown in FIG. 1, a printer 10 incorporates a printing unit in an interior of a housing defined by a housing main body portion 11 having a substantially rectangular parallelepiped shape and an upper lid portion 13 which covers an upper portion of the housing main body portion 11.

Additionally, the printer 10 has a discharge port 21 at a front end of the housing from which a tape member, which is a printing member on which characters, for example, are printed, is discharged and includes a printing mechanism in an interior of the housing main body portion 11. In addition, a tape web 90 can be accommodated in the interior of the housing main body portion 11. The printer 10 has a plug terminal 23 in a lateral side of the housing main body portion 11 which receives printing data such as a string of characters from a PC (Personal Computer) or a label preparing characters input device. The printer 10 also has a lamp 18 below the discharge port 21 which is turned on and off to indicate that data is being inputted or outputted.

Figure 3:
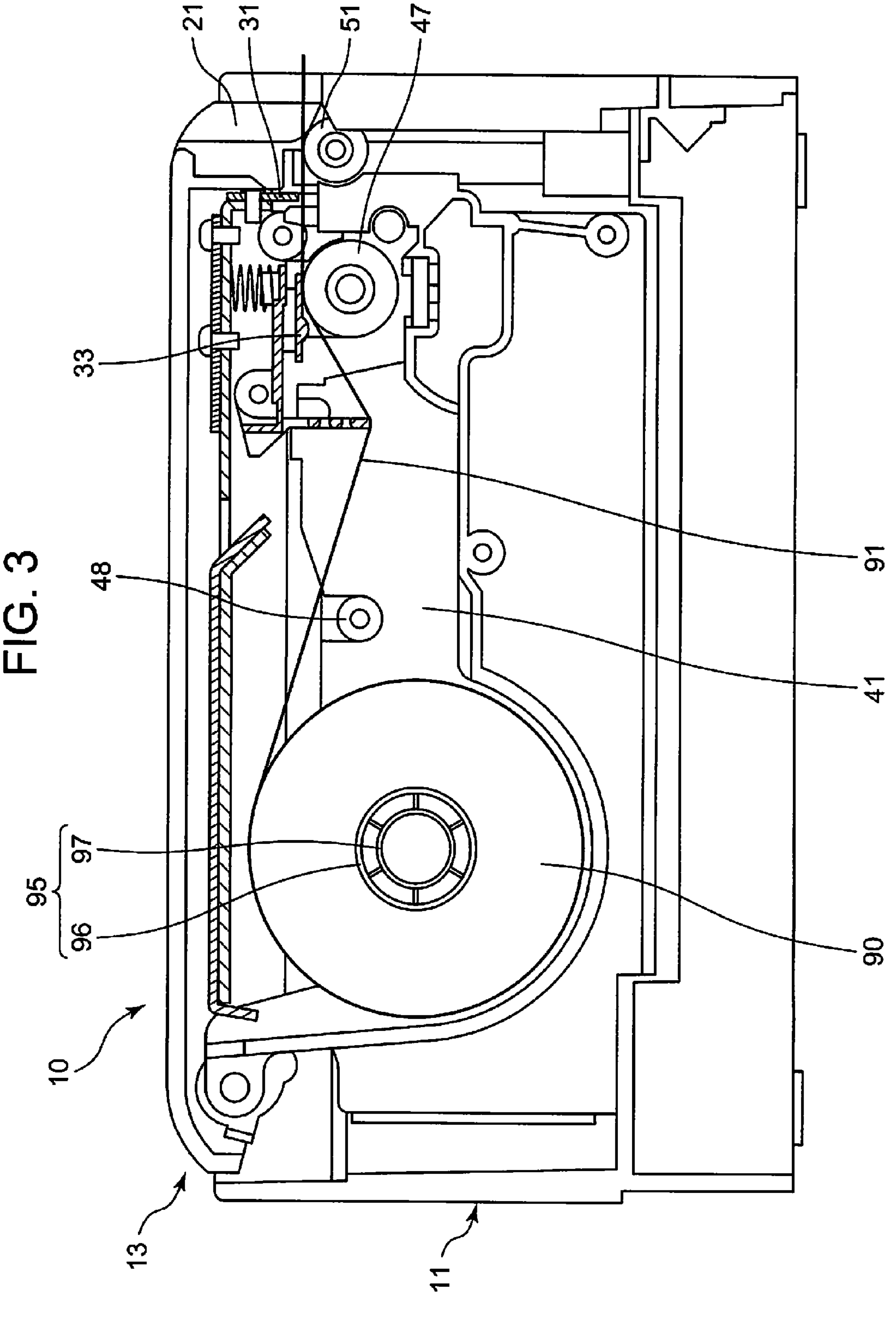
FIG. 3 is an exemplary diagram showing a side sectional view of the printer according to the invention.

As shown in FIGS. 2 and 3, the printer 10 has a thermal head 33 and a cutter 31 which are provided near a distal end of an inner side of the upper lid portion 13, so that a tape member 91 which is discharged from the discharge port 21 shown in FIG. 1 can be cut at a location of the discharge port 21 by using the cutter 31 which is a tape cutting mechanism.

Additionally, the printer 10 has a conveyor roller 47 which is provided in the housing main body portion 11 and in a position which corresponds to the position of the thermal head 33 provided on the inner side of the upper lid portion 13. Then, the conveyor roller 47 and the thermal head 33 make up the printing mechanism which is provided in the interior of the housing main body portion 11, so that characters, symbols and/or patterns are printed on a heat-sensitive paper tape held by the thermal head 33 and the conveyor roller 47 therebetween while the heat-sensitive paper tape is being fed out by the conveyor roller 47.

Figure 4:
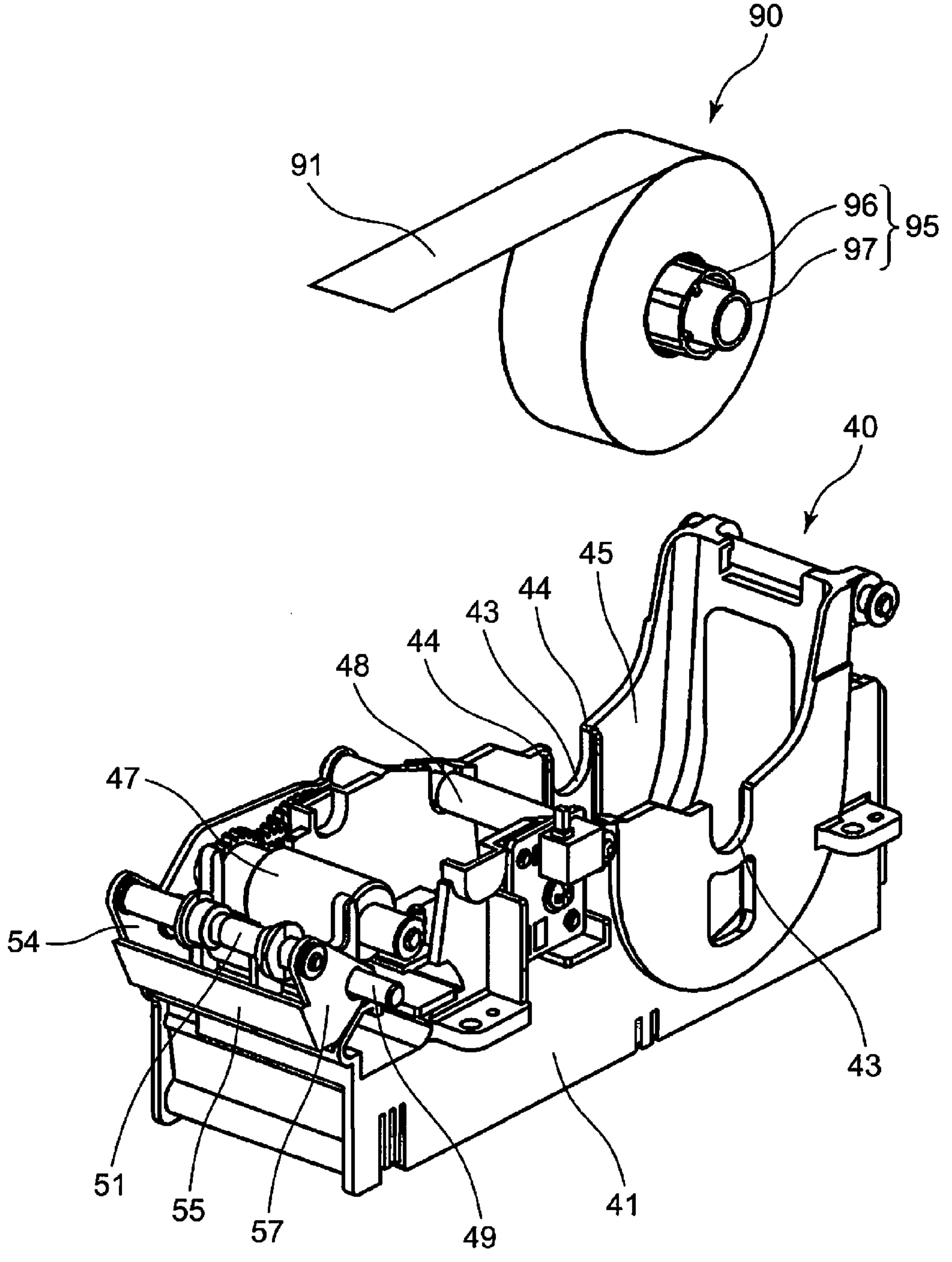
FIG. 4 is a perspective view showing briefly a printing unit of the printer according to the invention.

The conveyor roller 47 is provided in a printing unit 40 which is accommodated in the housing main body portion 11. The printing unit 40 has, as shown in FIG. 4, web guide grooves 43 for receiving a shaft portion 97 of the tape web 90 in left and right side plates of a chassis 41, as well as the conveyor roller 47 and an auxiliary roller 48 between the left and right side plates. Additionally, the printing unit 40 also includes a driving mechanism for these rollers which is fixed to the chassis 41.

This printing unit 40 uses the chassis 41 made of a metal plate and includes a tape web accommodating portion 45 which is defined within the chassis 41. The printing unit 40 has the conveyor roller 47, the auxiliary roller 48 which rotates in association with the conveyor roller 47 and a guide roller 51 which is provided near the discharge port 21 for regulating left and right sides of the tape member 91 and so on. The printing unit 40 also has a drive unit and a control unit for controlling the drive unit and the printing mechanism. The control unit will be described in detail later.

The tape web accommodating portion 45 is defined on a deeper side of the printing unit 40, and the U-shaped web guide grooves 43 which are opened at upper ends thereof are formed in the left and right side plates of the chassis 41. Then, both ends of the shaft portion 97 of a tape web core 95 are supported in the web guide grooves 43. Guide ribs 44 are provided near the web guide groove 43 on an inner side of each side plate, so that each end of a main body portion 96 of the tape web core 95 is brought into contact with the guide ribs 44 so as to position the tape web 90 properly in the tape web accommodating portion 45. Additionally, a tape web detection unit made up of a photo sensor is provided in the tape web accommodating portion 45. This tape web detection unit detects a color of a wall of an inner bottom portion of the main body portion 96 of the tape web 90 or a distance to the wall and then detects a tape width of the tape web 90 and the existence of a release tape.

In addition, in unwinding the tape member 91, which is the heat-sensitive paper tape, wound around the tape web core 95 from the tape web 90, the auxiliary roller 48 unwinds the tape member 91 which is wound into a roll in cooperation with the conveyor roller 47 while applying an appropriate tension to the tape member 91 unwound from the tape web 90 without changing largely a feeding angle at which the tape member 91 is fed to the conveyor roller 47 even when the diameter of the tape web 90 decreases as a result of the tape member 91 being consumed.

The tape member 91 on which characters or the like are printed is a synthetic paper to one side of which a releasable adhesive having weak adhesion properties is applied. This adhesive contains, according to its formula, from 65 to 75% water, from 25 to 35% acrylic ester based copolymer and less than 1% mineral oil. A release coating is applied to a side of the synthetic paper or the tape member 91 which is opposite to the side where the adhesive is applied, and the tape member 91 is wound around the main body portion 96 of the tape web core 95.

Figure 5:
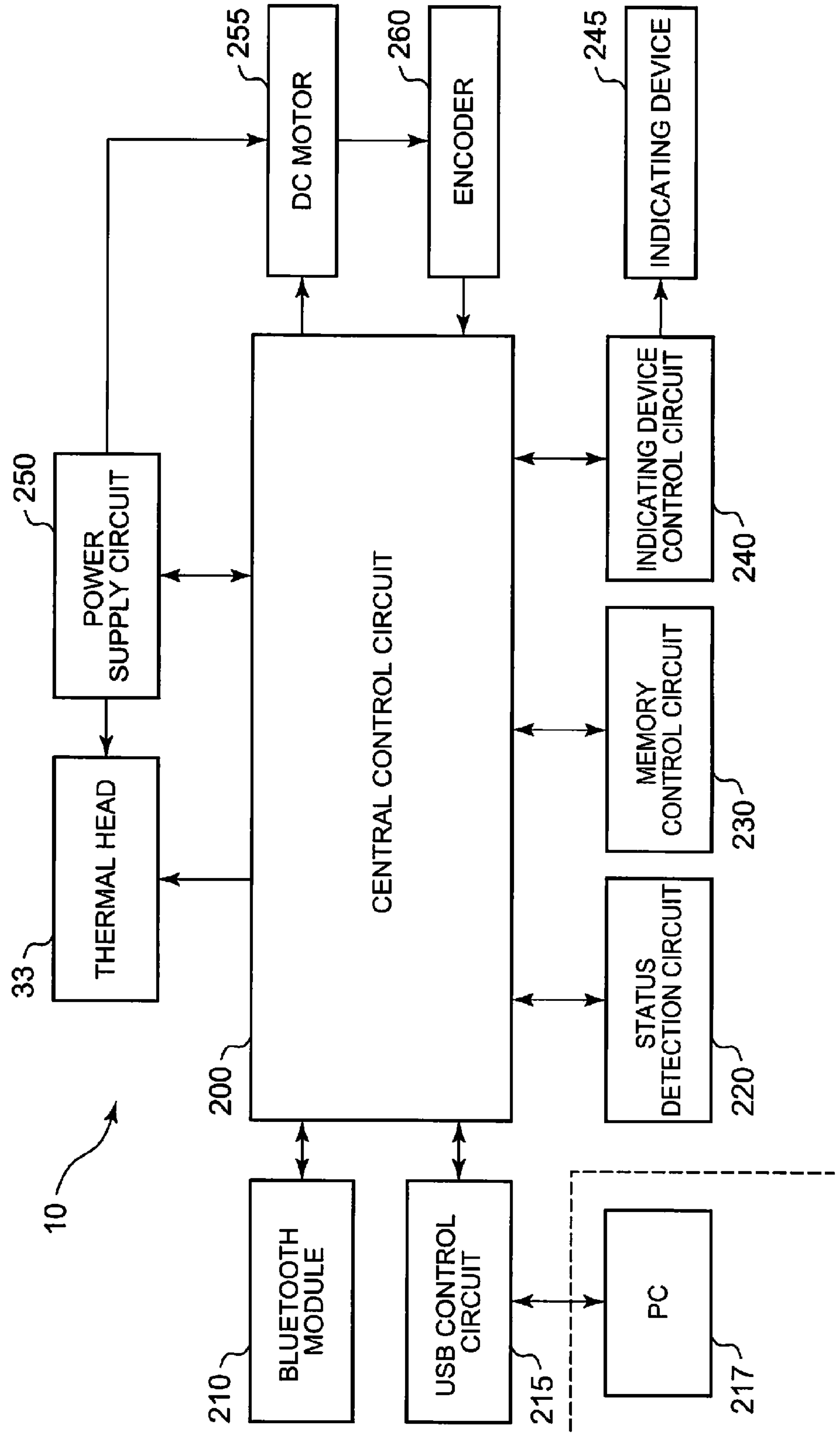
FIG. 5 is a system block diagram including a PC of the printer according to the invention.

Next, a system configuration of the printer 10 will be described by reference to the drawing. FIG. 5 is a system block diagram of the printer 10 according to the invention.

The system configuration of the printer 10 is formed by connecting the printer 10 which is connected to an AC adapter to a PC (Personal Computer) 217 which is a host terminal via a USB control circuit 215 which is a USB interface. In addition, there may an occasion on which the printer 10 is connected wirelessly to the host terminal such as the PC via a Bluetooth (a registered trademark) module 210.

As shown in FIG. 5, the printer 10 includes a central control circuit 200 which is a control unit made up of a CPU. A memory control circuit 230 is connected to the central control circuit 200, and this memory control circuit controls memories such as a ROM which stores a program and a RAM which functions as a working area.

The central control circuit 200 has a timer function and a clock function and counts a pulse time or measures an interval time using these functions.

Additionally, a status detection circuit 220 is connected to the central control circuit 200, and this status detection circuit 220 executes the detection of an opening lever which moves in association with the movement of the upper lid portion 13 which is opened and closed as the tape member 91 is loaded by a user and the detection of the type of the tape member 91 loaded by the tape web detection unit which has been described above.

An indicating device control circuit 240 is connected to the central control circuit 200, and this indicating device control circuit 240 illuminates or turns on and off the lamp 18 (an LED) shown in FIG. 1 which is an indicating device 245 for indicating that the printer 10 is in communication with the host terminal or that a communication error is occurring in communication between the printer 10 and the host terminal.

Further, the central control circuit 200 controls a power supply circuit 250 which constitutes main power supplies for the thermal head 33 and a DC motor 255, which is a conveyor motor functioning as the drive unit, and also controls directly the driving of the DC motor 255 in an ON/OFF fashion and the thermal head 33 which is the printing mechanism.

Additionally, in controlling finely the rotational speed of the DC motor 255 which conveys the tape member 91, an encoder 260 which is connected to a motor drive system and a photo sensor for measuring a pulse of the encoder 260 are connected to the central control circuit 200, and for example, the central control circuit 200 performs a PWM control.

In this way, by controlling the rotational speed of the motor and hence the conveying speed of the tape member 91 through PWM control using the DC motor 255, the conveying speed can easily be controlled to a desired speed and it becomes possible to obviate the necessity of a motor driver which is necessary when a stepping motor is used, thereby making it possible not only to decrease parts costs in relation to the motor driver and the motor itself and hence the production cost of the printer but also to facilitate the fabrication of the printer.

Additionally, the central control circuit 200 realizes a standard printing speed which matches the printer 10 in order to execute printing to produce a beautiful print within a short period of time according to the performance of the CPU, the rated output of the thermal head and the type of the tape member 91 and the like.

Specifically, in conveying the tape member 91, in the central control circuit 200, in order to set the conveying speed to a predetermined target conveying speed, that is, in order to set a pulse period to a target pulse period in response to material properties of the tape member 91 which is the printing member, properties of the adhesive and the like, an edge of a pulse produced by the encoder 260 is detected by the photo sensor, and a pulse width in terms of time is measured using, for example, a timer counter so as to calculate a pulse period. Then, in order to perform a low speed control and a standard speed control according to the pulse period, for example, a feedback control such as PID control is executed.

Then, in conveying the tape member 91 to a predetermined amount, the central control circuit 200 can monitor the conveying amount of the tape member 91 by counting the number of pluses produced by the encoder 260.

Namely, the encoder 260 is designed to produce four pulses per one full rotation of the DC motor 255. In this embodiment, the tape member 91 is conveyed 0.125 mm by one full rotation of the DC motor 255. In a standard speed which is a conveying speed at which the tape member 91 is conveyed 10 mm per second, the DC motor 255 rotates 80 rotations within one second, and the period of one pulse becomes 3.125 msec.

In this way, the central control circuit 200 executes printing on the tape member 91 by controlling the thermal head 33 which makes up the printing mechanism while controlling the DC motor 255 of the drive unit which conveys the tape member 91 at a predetermined speed according to information on printing data that is transmitted from the PC or the like.

Figure 6:
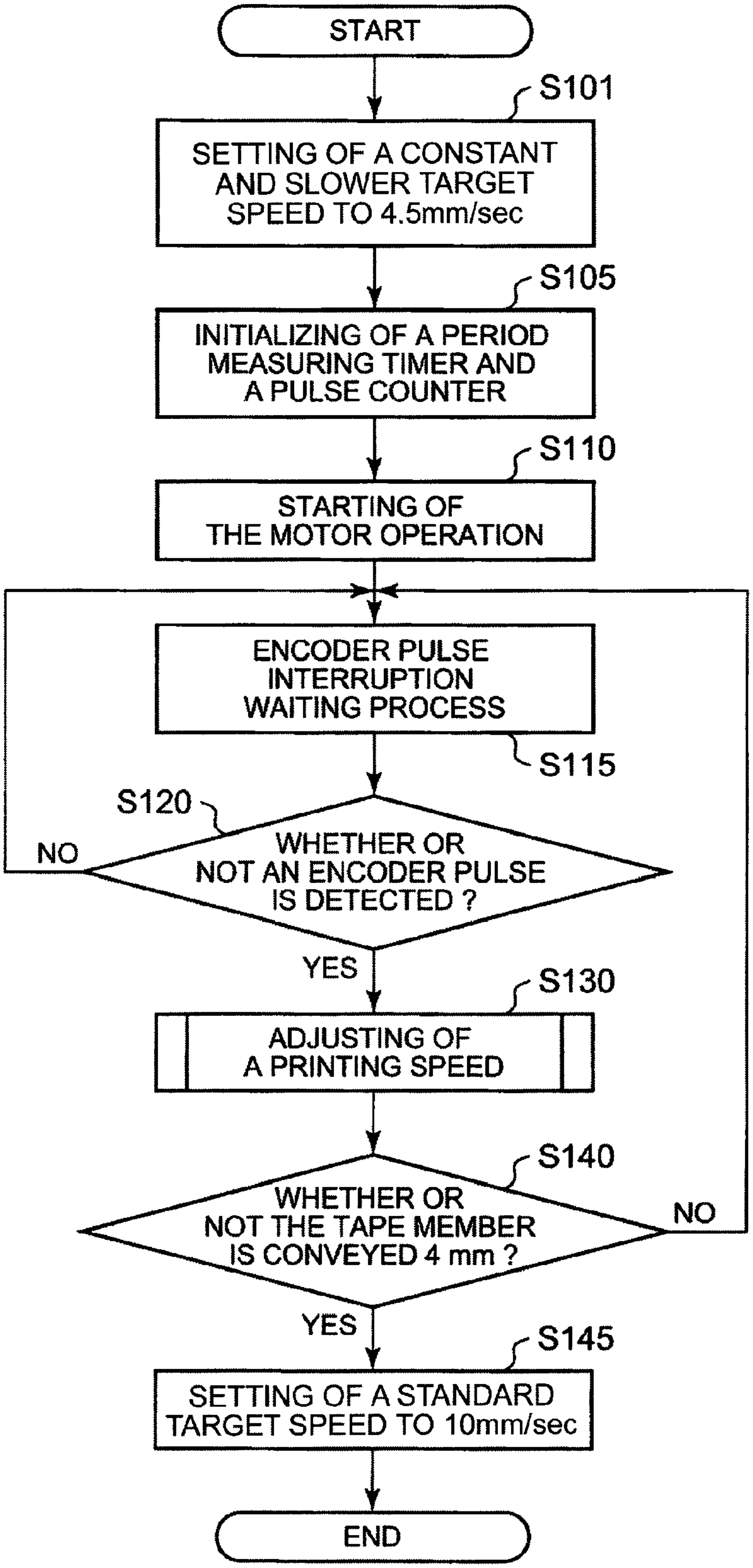
FIG. 6 is a flowchart showing a flow of speed control when printing is performed by the printer according to the invention.
Figure 7:
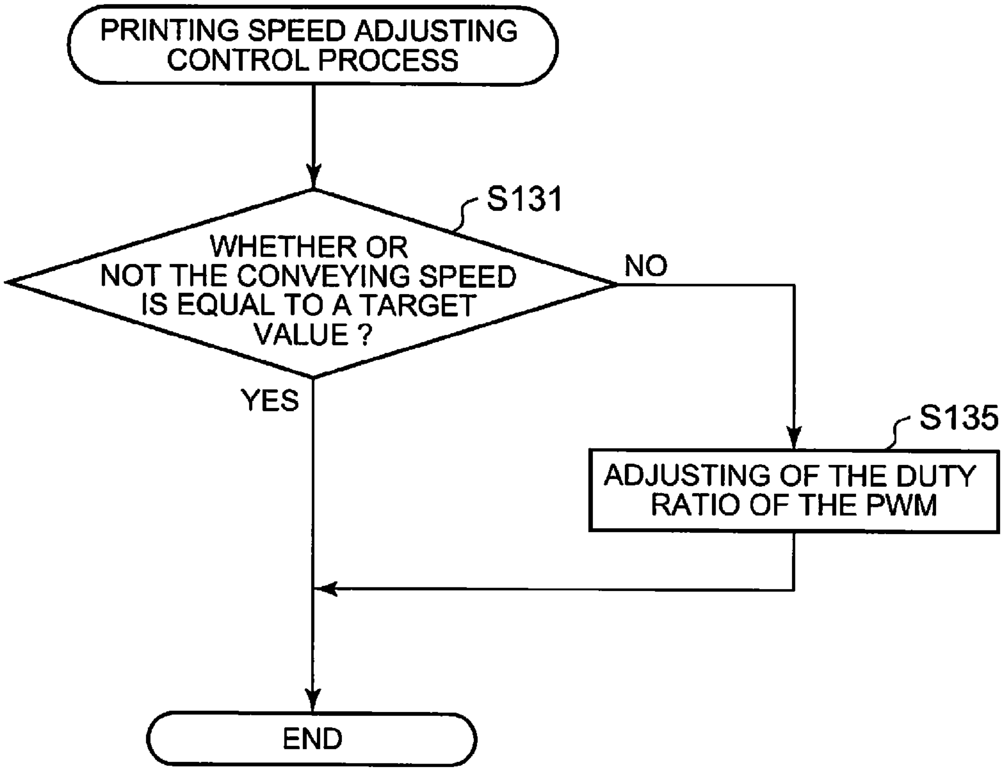
FIG. 7 is a flowchart showing a speed control process when printing is performed by the printer according to the invention.
Figure 8:
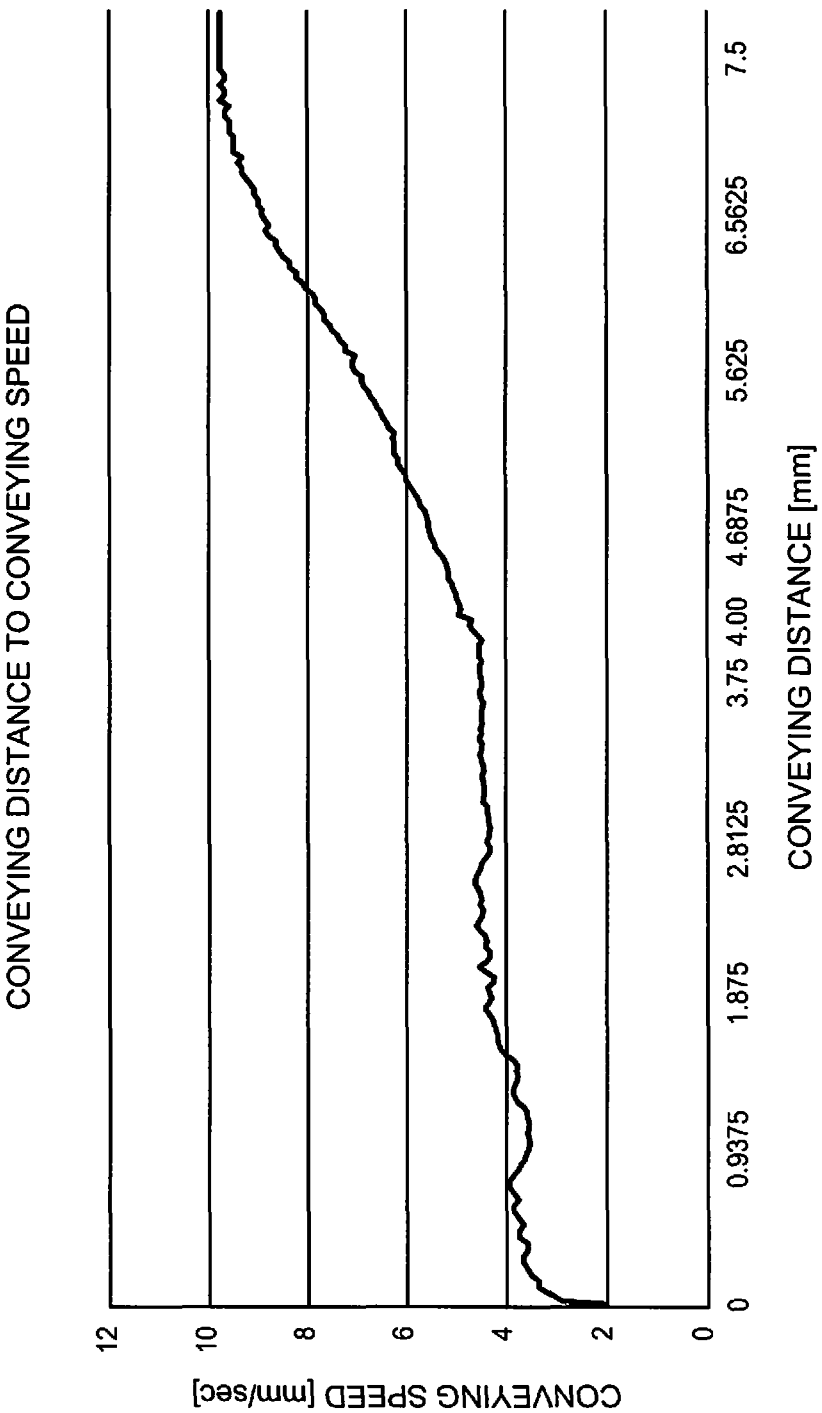
FIG. 8 is a graph showing a relation between conveying distance and conveying speed of the printer according to the invention.
Figure 9A:
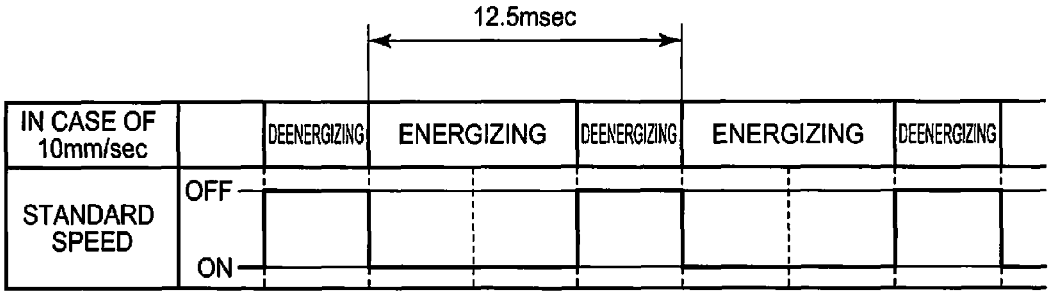
FIGS. 9A, 9B, 9C are time charts showing controls at a standard speed and a low speed when printing is performed by the printer according to the invention.
Figure 9B:
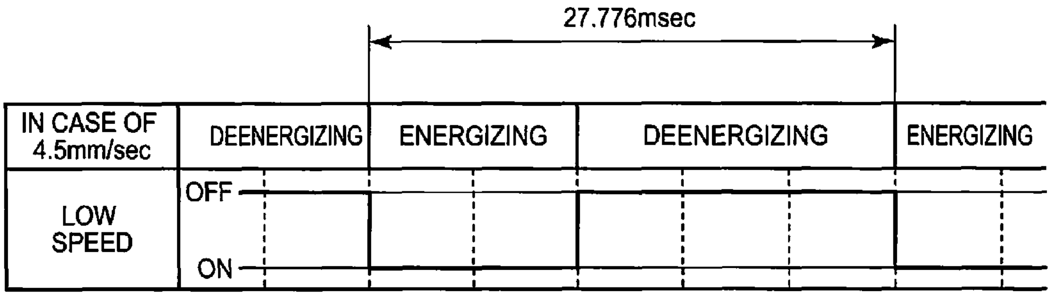
Figure 9C:
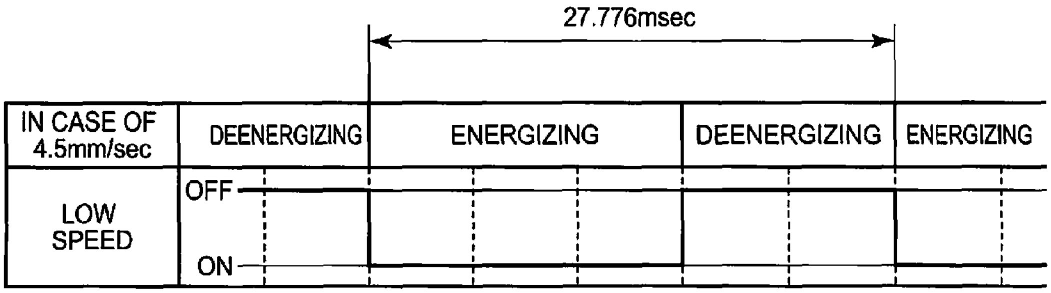

Next, a flow of speed control when printing is executed by the printer 10 will be described by reference to the drawings. FIGS. 6 and 7 are flowcharts showing a flow of speed control when printing is executed by the printer 10 according to the invention, and FIG. 8 is a graph showing a relation between conveying distance and conveying speed of the tape member 91 when the conveying speed is controlled to a low constant speed and then to the standard speed. Thus the DC motor 255 keeps the conveying speed at the low constant speed during the conveying distance between 0 mm to about 4 mm and increases the conveying speed from the low constant speed to the standard speed during the conveying distance longer than about 4 mm. FIGS. 9A, 9B and 9C shows time charts showing energizing states of the thermal head 33 when the rotational speed of the conveyor roller of the printer 10 according to the invention is controlled to the standard speed and the low speed.

In starting printing on the tape member 91 on receipt of a signal signaling the start of printing from the PC or the like, firstly, the central control circuit 200 confirms the existence of a release tape by causing the tape web detection unit to detect the type of the tape member 91 loaded and further determines by using the interval function whether or not a predetermined length of time in which affixation of the release tape to the conveyor roller is expected has elapsed since the last time the printer was used.

Then, determining that no release tape exists and that the predetermined length of time has elapsed, firstly, the central control circuit 200 executes a low speed setting process (step S101) and adjusts and controls the rotational speed of the DC motor 255 through PID control. In the low speed setting, in the event that a total length of a length over which the adhesive surface of the tape member 91 contacts the conveyor roller 47 and a margin is, for example, 4 mm, in order to execute the low speed control in which the tape member 91 is conveyed a conveying distance of 4 mm so that the adhesive surface thereof moves away from the conveyor roller 47 in an ensured fashion when the tape member 91 is started to be conveyed, the target speed is set to 4.5 mm/sec based on the assumption that the target period of the pulse period is, for example, 6.944 msec.

When the tape member 91 is conveyed under the speed control based on the low speed setting (step S101), a printing period in which one line (corresponding to 0.125 mm) is printed on the tape member 91 in four pulses results in an energizing time of the thermal head 33 of the printing mechanism, and therefore, in the low speed control, the central control circuit 200 controls the energizing and deenergizing of the thermal head based on the understanding that the heating period of the thermal head in the printing period of one line is 27.776 (msec) as shown in FIG. 9B or 9C.

The constant distance of 4 mm over which the tape member 91 has to be conveyed under the low speed control is determined as a length which exceeds a range of length over which the tape member 91 is likely to stick to the conveyor roller 47 as a result of contacting the conveyor roller 47 for the long period of time in an ensured fashion. A length corresponding to on the order of one fourth the circumferential length of the conveyor roller 47 is taken as a guideline for the constant length.

Namely, the conveying distance under the low speed control varies according to the diameter of the conveyor roller 47. For example, with a large-sized printer which includes a conveyor roller 47 having a large diameter so as to enable printing on a tape member 91 having an extremely wide width unwound from a tape web, the conveying distance at the low conveying speed is extended, and the contact range between the tape member 91 and the conveyor roller 47 changes according to the diameter of the conveyor roller 47 or the shape of a conveying path of the tape member 91. However, on the order of a fraction of an outer circumferential length of the conveyor roller 47 should be taken as a guideline for the conveying distance under the low speed control.

Next, the central control circuit 200 starts to control the speed of the DC motor 255 through PWM control such as PID control while monitoring the pulse period using a period measuring timer based on the low speed setting process (step S101) in which the target period is set and initializes both the period measuring timer and a pulse counter (step S105) to convey the tape member 91 by the predetermined length. Then, the central control circuit 200 executes a motor operation starting process (step S110) in which the DC motor 255 is started to be driven at the low speed set in the low speed setting process (step S101).

The central control circuit 200 drives the DC motor 255 so that the pulse period becomes 6.944 msec through PWM. control such as PID control while monitoring the pulse period by using the period measuring timer and, along with this activates, executes a printing operation that is executed during the low speed conveyance of the tape member 91 in which the heating period in the printing period of one line is 27.776 msec.

In this printing operation, since the heating period in the printing period of one line is extended when the low speed control is executed, in the event that the energizing time is made equal to that resulting when the standard speed control is executed as shown in FIG. 9B, the deenergizing time is extended, resulting in fears that the resulting print blurs due to a drop in thermal head temperature. Therefore, the central control circuit 200 controls so that the energizing time is extended.

Specifically, since the pulse period becomes 6.944 msec during the low speed control in which the heating period in the printing period of one line is 27.776 msec, for example, as shown in FIG. 9C, the energizing time is made about 1.4 times that of the standard time control.

Although as the adhesive of the tape member 91 which is the printing material, the adhesive is used which is combined by, according to its formula, components of from 66 to 75% water, from 25 to 35% acrylic ester based copolymer and less than 1% mineral oil, in executing the low speed control, there may be a case where the speed set in the low speed setting is changed in consideration of the releasability which changes according to the type of the adhesive used on the tape member 91. In case the adhesion of the adhesive is weak, for example, there may be a case where the pulse period is set to range from 4 to 5.999 (msec) and the energizing time in the heating period in the printing period of one line is set to be on the order of about 1.2 times that used when the standard time control is executed.

In case the adhesion of the adhesive is weaker, the pulse period is set to be less than 4 msec, and the energizing time is defined as being equal to the energizing time used when the standard time control is executed, then, the energizing time being set to be changed case by case, whereby the releasability is ensured while eliminating the risk of a resulting print blurring due to a drop in thermal head temperature, thereby making it possible to maintain the printing quality of the printer 10. Also, in the standard speed control, the conveying speed that is set is changed similarly according to the properties of the adhesive applied to the tape member 91.

Then, when executing the motor operation starting process (step S110) in which the DC motor 255 is started to be driven under the low speed control, the central control circuit 200 executes an encoder pulse detection determination process (step s120) of detecting a pulse to count the number of pulses produced by the encoder 260 by executing a pulse edge detection process to detect a pulse edge in a pulse produced by the encoder 260 by executing a low active or high active pulse interruption waiting process (step S115).

When detecting a pulse in the encoder pulse detection determination process (step S120), the central control circuit 200 executes a printing speed adjusting control process (step S130) to control the printing speed which is the conveying speed of the tape member 91 when executing printing thereon and determines whether or not the tape member 91 is conveyed 4 mm (corresponding to 128 pulses in terms of the number of pulses) at the low conveying speed so that the adhesive surface of the tape member 91 moves away from the conveyor roller 47 in an ensured fashion based on a pulse number determination process (step S140) in which the number of pulses is counted by using the pulse counter while executing the pulse interruption waiting process (step S115).

In the printing speed adjusting control process (step S130), as shown in FIG. 7, it is determined whether or not the conveying speed or pulse interval in the pulse period when printing is executed is equal to a target value (step S131), and if it is determined that the conveying speed or pulse interval is not equal to the target value, the rotational speed of the DC motor 255 is adjusted by adjusting the duty ratio of the PWM in the PWM control process (step S135). On the other hand, if it is determined as a result of the determination on whether or not the conveying speed which is the printing speed or pulse interval is equal to the target value (step S131) that the conveying speed which is the printing speed or pulse interval is equal to the target value, the printing speed adjusting control process (step S130) ends.

In the pulse number determination process (step S140) in which whether or not the tape member 91 is conveyed 4 mm under the low speed control is determined, if the number of pulses counted by the pulse counter reaches 128, it being determined that the tape member 91 is conveyed over a distance exceeding the distance of 4 mm over which the tape member 91 should be conveyed when the conveyance of the tape member 91 is started whereby the adhesive surface of the tape member 91 moves away from the conveyor roller 47 in an ensured fashion, in order to change the speed control from the low speed control to the standard speed control in which the conveying speed is set to 10 mm/sec, the central control circuit 200 executes a standard speed setting process (step S145) in which the target period of the pulse period is changed to be set to 3.125 msec.

On the contrary, if it is determined that the number of pulses counted by the pulse counter does not reach 128, the flow of speed control returns to the pulse interruption waiting process (step S115), the encoder pulse detection determination process (step S120), the printing speed adjusting control process (step s130), or the pulse number determination process (step S140), so that the central control circuit 200 continues to execute the encoder pulse detection determination process (step S140) until the number of pulses detected reaches 128 and the conveying distance of the tape member 91 reaches 4 mm.

Then, in the standard speed control, the printing period is such that one line (corresponding to 0.125 mm) is printed on the tape member 91 in four pulses. Thus, as shown in FIG. 9A, the printing period of one line becomes a printing operation in which the heating period of the thermal head is 12.5 msec.

In this way, as shown in FIG. 8, the tape member 91 is conveyed by a conveying distance of about 4 mm with the conveying speed thereof set to 4 mm/sec which is the constant low speed, and thereafter, the conveying speed is set to 10 mm/sec which is the standard speed while the tape member 91 is conveyed a conveying distance of about 3 mm, whereafter the tape member 91 continues to be conveyed at the standard speed for printing.

In addition, when printing is resumed within a short period of time in which there is no risk of the tape member 91 strongly sticking to the conveyor roller 47 after the previous printing was completed, the tape member 91 is conveyed at the standard time from the start of printing.

Figure 10:
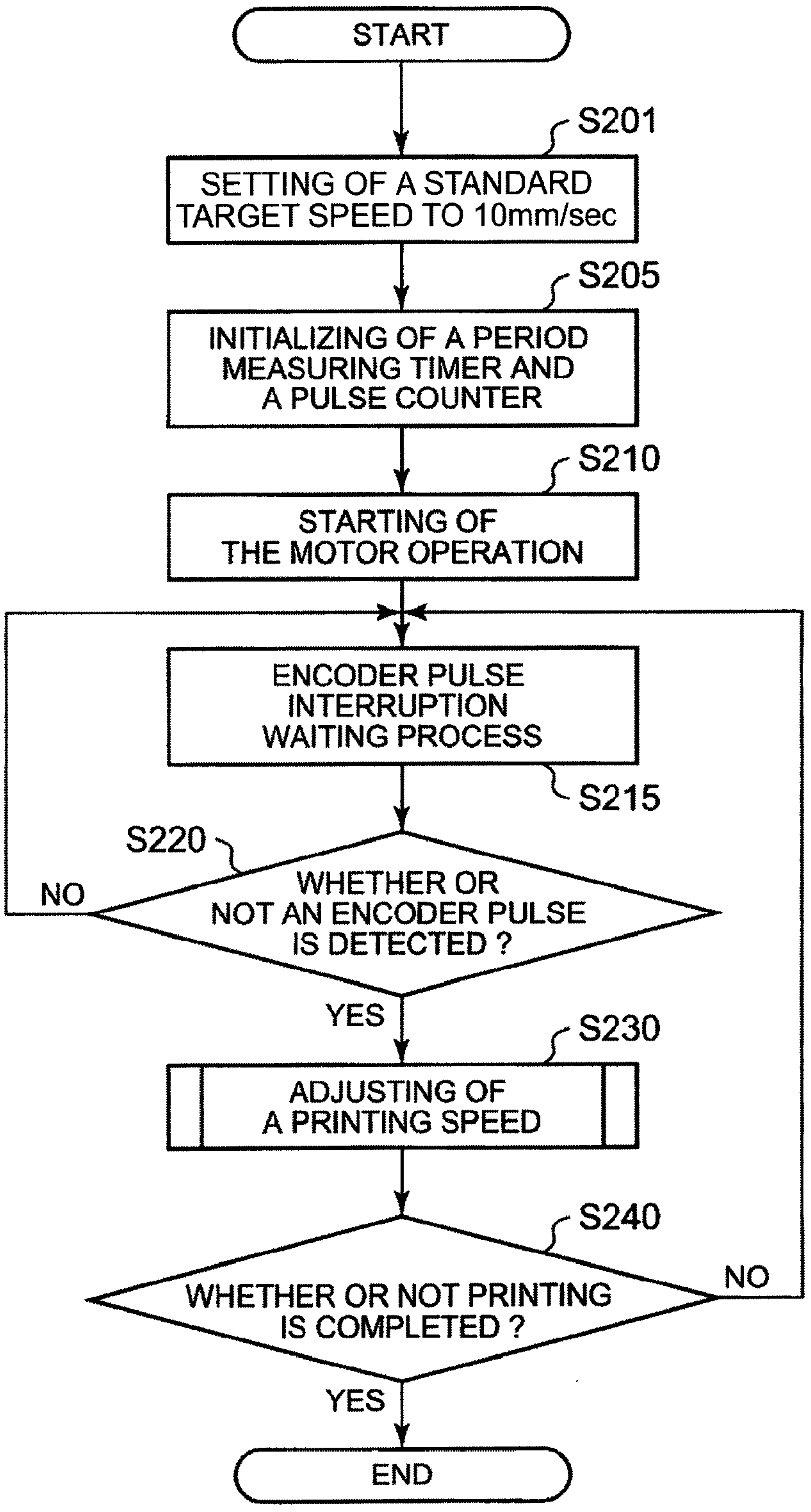
FIG. 10 is a flowchart showing a flow of speed control when printing is performed by the printer according to the invention.

As this occurs, in controlling the DC motor 255 through PID control, as shown in FIG. 10, the central control circuit 200 executes a standard speed setting process (step S201) in which the conveying speed of the tape member 91 is set to 10 mm/sec which is a target period, initializes both the period measuring timer and the pulse counter (step S205) and starts a motor operation starting process (step S210) in which the DC motor 255 is started to be driven at the standard speed set in the standard speed setting process (step S201).

The central control circuit 200 drives the DC motor 255 so that the pulse period becomes 3.125 msec through PWM. control such as PID control while monitoring the pulse period by using the period measuring timer and along with this, executes a printing operation based on the standard speed setting in which the heating period in printing period of one line becomes 12.5 msec.

Then, when executing the motor operation starting process (step S210) in which the DC motor 255 is started to be driven under the standard speed control, the central control circuit 200 executes an encoder pulse detection determination process (step S220) in which a pulse is detected to count the number of pulses by executing a pulse interruption waiting process (step S215) in which a pulse edge detection of detecting a pulse edge in a pulse produced by the encoder 260 is executed.

When detecting a pulse in the encoder pulse detection determination process (step S220), the central control circuit 200 executes a printing speed adjusting control process (step S230) and executes a printing completion determination process (step S240). If it is determined that printing is not completed, the central control circuit 200 repeats the pulse interruption waiting process (step S215), the printing speed adjusting control process (step S230), the encoder pulse detection determination process (step S220) and the printing completion determination process (step S240).

Figure 11:
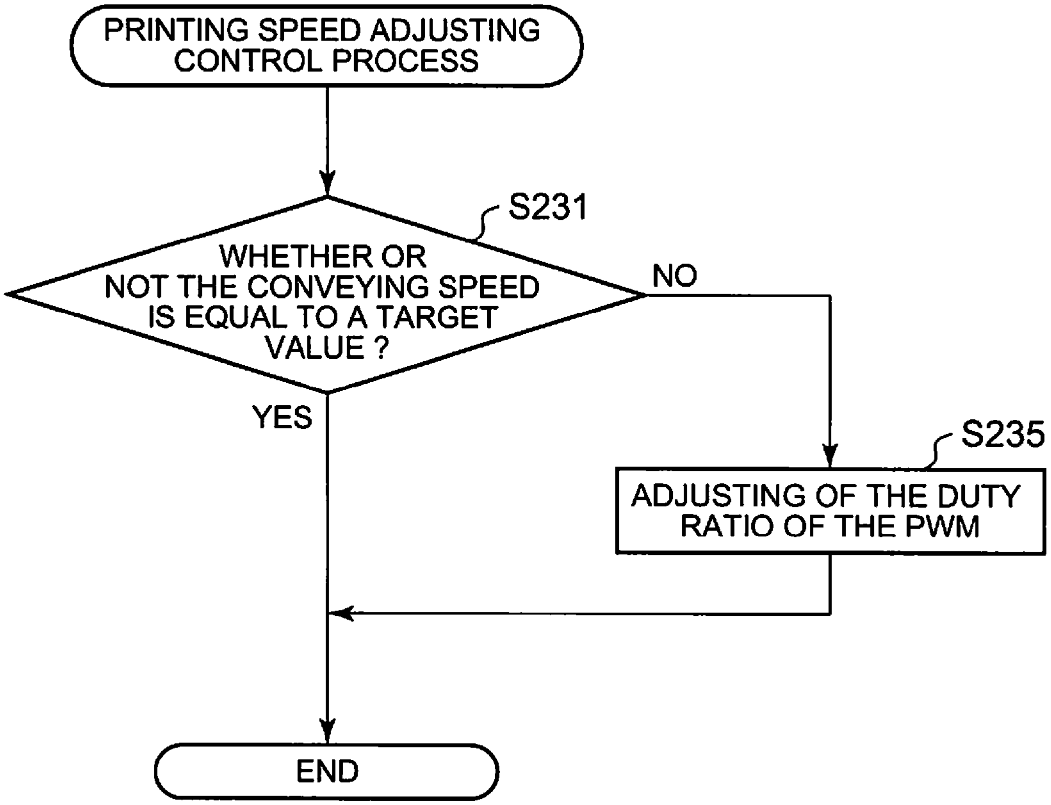
FIG. 11 is a flowchart showing a speed control process when printing is performed by the printer according to the invention.

In the printing speed adjusting control process (step S230), as shown in FIG. 11, it is determined whether or not the printing speed is equal to a target value (step S231). Then, if it is determined from the result of this determination on whether or not the printing speed is the target speed that the printing speed is not equal to the target value, the rotational speed of the DC motor 255 is adjusted by adjusting the duty ratio of the PWM in the PWM control (step S235). On the other hand, if it is determined from the result of the determination on whether or not the printing speed is the target value that the printing speed is equal to the target value, the printing speed adjusting control process (step S230) ends.

In the standard speed control, the printing period is such that one line (corresponding to 0.125 mm) is printed on the tape member 91 in four pulses, and therefore, printing is operated in such a way that the printing period of one line results in an energizing time of the thermal head 33 of 12.5 msec, as shown in FIG. 9A.

Figure 12:
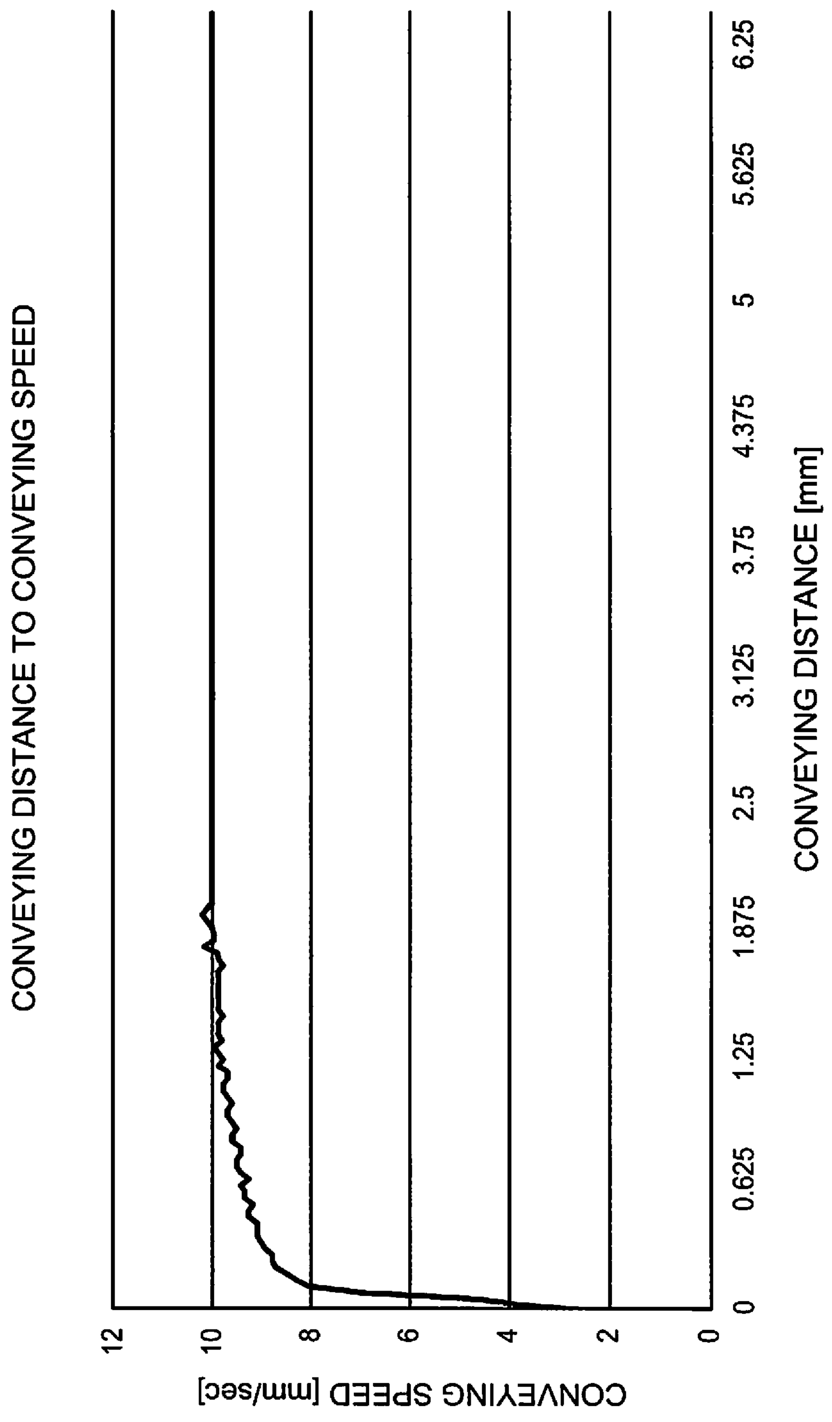
FIG. 12 is a graph showing a relation between conveying distance and conveying speed of the printer according to the invention.

In this way, as shown in FIG. 12, the DC motor 255 is driven through PWM control such as PID control with the conveying speed of the tape member 91 set to 10 mm/sec which is the standard speed, and the conveying speed reaches the standard speed when the tape member 91 is conveyed a conveying distance of the order of about 2 mm from the start of operation of the DC motor 255 and after that, printing is executed on the tape member 91.

In the embodiment, while the low speed control is described as being executed while taking the inoperative period or operation interval of the printer into consideration as printing is started, the invention is not limited thereto. In other cases than continuous printing, there will be no problem in adopting configuration in which a process including the low speed control is executed every time printing is started. Additionally, a configuration may be adopted in which only the processes based on the standard speed control are executed based on the understanding that there is no interval in continuous printing.

Thus, according to the embodiment, it is possible to provide the printer 10 and the printing method for performing printing while reducing the risk of the printing member jam in the interior of the printer.

In addition, according to the embodiment, by adopting the configuration in which the conveyor roller 47 contacts the back surface of the tape member 91 which is the printing member, the thermal head 33 of the printing mechanism is placed on the front surface side of the printing member so as to hold the printing member by the thermal head 33 and the conveyor roller 47 therebetween, thereby making it possible to execute high-quality printing while ensuring the conveyance of the printing member.

Further, according to the embodiment, the length over which the tape member 91 which is the printing member is conveyed at the low speed when the conveyor roller 47 is started to be driven is set to the length over which the conveyor roller 47 contacts the back surface of the tape member 91. Therefore, even in the event that the printing member sticks to the conveyor roller 47, the sticking portion is conveyed at the low speed, whereby the printing member is released from the conveyor roller 47 to thereby prevent the tape jam in the printer.

Additionally, according to the embodiment, by employing the DC motor 255, it is possible to produce the printer easily and at low cost.

In addition, according to the embodiment, the time is measured which elapses from a point in time when a series of printing operations by the printing mechanism ends to a point in time when the printing tape is started to be conveyed for the next printing and it is determined based on the elapsing time measured for the next printing whether the printing member is controlled in such a way as to be conveyed first at the constant speed which is slower than the standard speed and then conveyed at the standard speed which is faster than the low speed or in such a way as to be conveyed at the constant speed which is the standard speed throughout printing. Therefore, since there is no risk of the tape member 91 which is the printing member sticking to the conveyor roller 47 in the continuous printing, the tape member 91 can be controlled so as to be conveyed at the standard speed throughout printing.

Further, according to the embodiment, the control unit controls the energizing time of the thermal head 33 according to the rotational speed of the conveyor roller 47, that is, whether the conveyor roller 47 rotates at the low speed or the standard speed. Therefore, there is no risk of the temperature of the thermal head dropping during printing, thereby making it possible to execute appropriate printing. Then, when more time is required to print one line on the tape member 91 which is conveyed at the low speed, the energizing time of the thermal head can be extended so as to prevent the drop in temperature of the thermal head.

Furthermore, according to the embodiment, the control unit sets the conveying speed to the low speed or the standard speed based on the type of the adhesive applied to the printing member, whereby the occurrence of a printing member jam at the start of printing can be suppressed.

In addition, according to the embodiment, the printing tape is the long tape member 91 which is made into a web, and therefore, only margins according to labels prepared are produced, thereby making it possible to reduce waste in the tape member 91.

According to the embodiment, the printer includes further the cutting mechanism, and therefore, a label of a predetermined length can be prepared without using a pair of scissors.

In addition, according to the embodiment, the printer includes the tape web detection unit for detecting the type of the tape member 91 loaded therein, and the tape web detection unit can detect the existence of the release paper on the tape member 91. Therefore, it is possible to detect the possibility of occurrence of sticking.

Further, according to the embodiment, when the tape web detection unit detects that the release paper is applied to the tape member 91, the control unit controls so that the tape member 91 is conveyed at the standard speed throughout printing without being conveyed at the low speed, whereby the occurrence of a tape jam is prevented, thereby making it possible to enable high-speed printing while ensuring the printing quality.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A printer comprising:

a conveyor roller for conveying a printing member having an adhesive on a back surface which is opposite to a printing surface thereof, the conveyor roller being brought into contact with the back surface of the printing member so as to convey the printing member;

a printing mechanism for performing printing on the printing member which is conveyed;

a drive unit for driving to rotate the conveyor roller; and a control unit for (i) when the printing member is started to be conveyed for printing, setting a rotational speed of the conveyor roller to a constant and slower target speed which is slower than a standard target speed, and controlling the drive unit so as to drive to rotate the conveyor roller to convey the printing member at the constant and slower target speed for a duration after the printing member is started to be conveyed and before the printing member is conveyed by a conveyance length, and (ii) after the printing member is conveyed by the conveyance length, setting the rotational speed of the conveyor roller to the standard target speed, and controlling the drive unit so as to drive to rotate the conveyor roller to convey the printing member at the standard target speed;

wherein the conveyance length is determined based on a contact length between the conveyor roller and the back surface of the printing member and varies according to a diameter of the conveyor roller.

2. The printer according to claim 1, wherein the conveyance length is a total length of a contact length over which the conveyor roller is in contact with the back surface of the printing member and a margin.

3. The printer according to claim 2, wherein the drive unit is a DC motor.

4. The printer according to claim 3, wherein the printing member is a rolled long tape member.

5. The printer according to claim 4, further comprising a cutter mechanism.

6. The printer according to claim 2, wherein the contact length changes according to the diameter of the conveyor roller or a shape of a conveying path of the printing member.

7. The printer according to claim 1, wherein the control unit measures a length of time that elapses from a point in time at which a previous printing operation by the printing mechanism has ended to thereby determine, based on the length of time having been measured, whether to (i) set the rotational speed of the conveyor roller to the constant and slower target speed and control the drive unit so as to drive to rotate the conveyor roller to convey the printing member at the constant and slower target speed and thereafter so as to drive to rotate the conveyor roller to convey the printing member at the standard target speed, or (ii) set the rotational speed of the conveyor roller to the standard target speed and control the drive unit so as to drive to rotate the conveyor roller to convey the printing member at the standard target speed without first conveying the printing member at the constant and slower target speed.

8. The printer according to claim 1, wherein:

various different types of printing members are selectively loadable in the printer, the printing members differing from one another by the existence of release paper which covers the adhesive thereof or by a type of the adhesive thereof;

the printer further comprises a printing member detection unit for detecting a type of a printing member loaded therein;

when the printing member detection unit detects that the loaded printing member has release paper, the control unit sets the rotational speed of the conveyor roller to the standard target speed and controls the drive unit so as to drive to rotate the conveyor roller to convey the printing member at the standard target speed without first conveying the printing member at the constant and slower target speed; and when the printing member detection unit detects that the loaded printing member does not have release paper, the control unit sets the rotational speed of the conveyor roller to the constant and slower target speed and controls the drive unit so as to drive to rotate the conveyor roller to convey the printing member at the constant and slower target speed and thereafter sets the rotational speed of the conveyor roller to the standard target speed and controls the drive unit so as to drive to rotate the conveyor roller to convey the printing member at the standard target speed.

9. The printer according to claim 1, wherein the printing mechanism comprises a thermal head, and the control unit controls so that an energizing time of the thermal head is extended so as to increase a heat value thereof when the control unit sets the rotational speed of the conveyor roller to the constant and slower target speed.

10. The printer according to claim 1, wherein the conveyance length is on the order of one fourth of a circumferential length of the conveyor roller.

11. The printer according to claim 1, wherein the conveyance length is longer as the diameter of the conveyor roller is larger.

12. The printer according to claim 1, wherein the conveyance length on the order of a fraction of an outer circumferential length of the conveyor roller is a basis for a conveying distance of the printing member under low speed control.

13. A printing method for a printer, the printer comprising (i) a conveyor roller for conveying a printing member having an adhesive on a back surface which is opposite to a printing surface thereof, the conveyor roller being brought into contact with the back surface of the printing member so as to convey the printing member, (ii) a printing mechanism for performing printing on the printing member which is conveyed, and (iii) a drive unit for driving to rotate the conveyor roller, the method comprising:

when the printing member is started to be conveyed for printing, setting a rotational speed of the conveyor roller to a constant and slower target speed which is slower than a standard target speed, and controlling the drive unit so as to drive to rotate the conveyor roller to convey the printing member at the constant and slower target speed for a duration after the printing member is started to be conveyed and before the printing member is conveyed by a conveyance length; and after the printing member is conveyed by the conveyance length, setting the rotational speed of the conveyor roller to the standard target speed, and controlling the drive unit so as to drive to rotate the conveyor roller to convey the printing member at the standard target speed;

wherein the conveyance length is determined based on a contact length between the conveyor roller and the back surface of the printing member and varies according to a diameter of the conveyor roller.

14. The printing method according to claim 13, wherein the conveyance length is a total length of a contact length over which the conveyor roller is in contact with the back surface of the printing member and a margin.

15. The printing method according to claim 14, wherein the conveyor roller is rotated by a DC motor.

16. The printing method according to claim 15, wherein the printing member is a rolled long tape member.

17. The printing method according to claim 16, wherein the printer further comprises a cutter mechanism.

18. The printing method according to claim 14, wherein the contact length changes according to the diameter of the conveyor roller or a shape of a conveying path of the printing member.

19. The printing method according to claim 13, further comprising:

measuring a length of time that elapses from a point in time at which a previous printing operation by the printing mechanism has ended to thereby determine, based on the length of time having been measured, whether to (i) set the rotational speed of the conveyor roller to the constant and slower target speed and control the drive unit so as to drive to rotate the conveyor roller to convey the printing member at the constant and slower target speed and thereafter so as to drive to rotate the conveyor roller to convey the printing member at the standard target speed, or (ii) set the rotational speed of the conveyor roller to the standard target speed and control the drive unit so as to drive to rotate the conveyor roller to convey the printing member at the standard target speed without first conveying the printing member at the constant and slower target speed.

20. The printing method according to claim 13, wherein:

various different types of printing members are selectively loadable in the printer, the printing members differing from one another by the existence of release paper which covers the adhesive thereof or by a type of the adhesive thereof;

the printer further comprises a printing member detection unit for detecting a type of a printing member loaded therein; and the method further comprises:

when the printing member detection unit detects that the loaded printing member has release paper, setting the rotational speed of the conveyor roller to the standard target speed and controlling the drive unit so as to drive to rotate the conveyor roller to convey the printing member at the standard target speed without first conveying the printing member at the constant and slower target speed; and when the printing member detection unit detects that the loaded printing member does not have release paper, setting the rotational speed of the conveyor roller to the constant and slower target speed and controlling the drive unit so as to drive to rotate the conveyor roller to convey the printing member at the constant and slower target speed and thereafter setting the rotational speed of the conveyor roller to the standard target speed and controlling the drive unit so as to drive to rotate the conveyor roller to convey the printing member at the standard target speed.

21. The printing method according to claim 13, wherein the printing mechanism comprises a thermal head, and the method further comprises controlling an energizing time of the thermal head to be extended so as to increase a heat value thereof when the rotational speed of the conveyor roller is set to the constant and slower target speed.

22. The printing method according to claim 13, wherein the conveyance length is on the order of one fourth of a circumferential length of the conveyor roller.

23. The printing method according to claim 13, wherein the conveyance length is longer as the diameter of the conveyor roller is larger.

24. The printing method according to claim 13, wherein the conveyance length on the order of a fraction of an outer circumferential length of the conveyor roller is a basis for a conveying distance of the printing member under low speed control.

* * * * *